United States Patent [19]

Roitman et al.

[11] Patent Number: 4,902,767

[45] Date of Patent: Feb. 20, 1990

[54] HIGH SLIP URETHANE-SILOXANE COATINGS

[75] Inventors: Lipa Roitman; Robert A. Auerbach, both of Erie, Pa.

[73] Assignee: Lord Corporation, Erie, Pa.

[21] Appl. No.: 284,830

[22] Filed: Dec. 14, 1988

Related U.S. Application Data

[63] Continuation of Ser. No. 54,900, May 28, 1987, abandoned.

[51] Int. Cl.[4] ............................................... C08G 77/04
[52] U.S. Cl. .................................... 528/28; 528/30; 528/38
[58] Field of Search ............................ 528/28, 30, 38

[56] References Cited

U.S. PATENT DOCUMENTS

| | | | |
|---|---|---|---|
| 2,893,898 | 7/1959 | Evans et al. | 117/161 |
| 2,924,587 | 2/1960 | Shorr | 260/46.5 |
| 3,243,475 | 3/1966 | Reischl et al. | 260/824 |
| 3,246,048 | 4/1966 | Haluska | 260/824 |
| 3,562,352 | 2/1971 | Nyilas | 260/824 |
| 4,033,912 | 7/1977 | Kleinmann et al. | 528/28 |
| 4,130,708 | 12/1978 | Friedlander et al. | 528/28 |
| 4,273,908 | 6/1981 | Blount | 528/28 |
| 4,413,102 | 11/1983 | Takatsuki et al. | 525/453 |
| 4,464,431 | 8/1984 | Hisaki et al. | 428/266 |
| 4,543,404 | 9/1985 | Sugano et al. | 528/28 |
| 4,572,871 | 2/1986 | Mabuchi et al. | 428/423.1 |
| 4,572,872 | 2/1986 | Yamasaki et al. | 428/423.1 |
| 4,617,340 | 10/1986 | Tanaka et al. | 528/28 |
| 4,647,643 | 3/1987 | Zdrahala et al. | 528/28 |
| 4,686,137 | 8/1987 | Ward, Jr. et al. | 528/28 |
| 4,692,476 | 9/1987 | Simpson | 528/28 |

*Primary Examiner*—Melvyn I. Marquis
*Attorney, Agent, or Firm*—Philip P. McCann; James W. Wright

[57] ABSTRACT

A reaction produce which includes a reactive silicone, a polyol, and an isocyanate. The reactive silicone may contain polyol or polyamine functionality. A urethane-siloxane copolymer of polydialkyl siloxane and polyurethane. A coating composition which contains a prepolymer of polydialkyl siloxane and polyurethane. A coated article may be produced wherein the article is coated with a composition that includes polydialkyl siloxane-polyurethane copolymer. A method for making a coating composition includes copolymerizing at least one reactive silicone, at least one polyol, and at least one isocyanate. A single-component coating which includes a polydialykl siloxane-polyurethane copolymer. A prepolymer in solution, wherein the prepolymer includes polydialkyl siloxane-polyurethane copolymer and a solvent, such as xylene.

6 Claims, No Drawings

HIGH SLIP URETHANE-SILOXANE COATINGS

This application is a continuation, of application Ser. No. 07/054,900 filed May 28, 1987, now abandoned.

BACKGROUND OF THE INVENTION

1. Field of the Invention

The present invention relates to a coating system based on a copolymer with valuable surface qualities. More particularly, the present invention relates to urethane-siloxane copolymers, and to coating compositions, to methods of making and using those compositions, and to articles coated with those compositions to impart the surface qualities of low friction, abrasion resistance, moisture resistance, and ice release properties.

2. Description of Background and Relevant Materials

Coatings may be used to alter the surface characteristics of substances whose desireable qualities do not extend to their native surface properties, or whose native surface properties are simply inappropriate to their operating environment.

For example, elastic or resilient materials may possess shock-absorbing and sound deadening qualities which render them extremely useful in a wide range of applications. However, they are also characterized by high surface friction, which is also referred to as low surface slip, and generally have poor resistance to surface abrasion. Porous rubbers, which are lightweight in addition to being shock-absorbing and sound-deadening, may have low surface slip and be even more susceptible to surface wear than nonporous rubbers.

In order to overcome these problems, it would be desireable to develop a coating that adheres well to substances such as rubber or plastic, and thereby provides them with a high slip, low-friction outer layer which is also abrasion-resistant. It would be particularly advantageous if such a coating had the additional quality of repelling moisture.

While high slip, abrasion-resistant coatings are not new, a one-pack coating that intrinsically provides these qualities, adheres to substrates such as rubber and plastic, and possesses the further qualities of water repellency and ice release without any need for additives, does not appear in the prior art.

Japanese Patent 0130880 is directed to compositions that contain urethane resin paint and silicone resin. When mixed just prior to use and coated onto cement, these compositions are asserted to repel moisture and prevent frost damage.

Japanese Patent 0062575 is directed to mixtures of silicone oil with thermo-setting or wet-setting polyurethane, diluted with a solvent such as toluene. These mixtures may be used as surface-treating agents, such as by spray-coating weather stripping.

Japanese Patent 046008 is directed to forming a prepolymer by reacting silicone polymer with isocyanate. The prepolymer is then mixed with polyurethane resin, and the resulting mixture may be used as a surface treating agent for car door weather stripping.

EVANS et al., U.S. Pat. No. 2,893,898, is directed to making textile materials water-repellent by treating them with a blend of an isocyanate and an organosilicone compound. The material to be treated may be contacted with the isocyanate and the organosilicone in either order or simultaneously, generally followed by heating.

SHORR, U.S. Pat. No. 2,924,587, is directed to a method for making textile fabrics water repellent by treating them with a blend of a siloxane and a polyisocyanate, in an inert solvent. SHORR speculates that the isocyanate cures the silicone and chemically bonds it to the surface of the textile fabric being treated.

REISCHL et al., U.S. Pat. No. 3,243,475, is directed to production of polyurethanes with improved moisture resistance. A polyester is reacted with a polyisocyanate in a reaction mixture containing an organo silicon compound, which has a reactive hydrogen linked to a silicon atom through an alkylene radical. The resulting polyurethanes may be used to make films, coatings, adhesives, foams, automobile tires, shoe soles, upholstery, and similar products.

HALUSKA, U.S. Pat. No. 3,246,048, is directed to organosiloxane-polyether-polyurethane copolymers with improved resistance to moisture. A siloxane, a hydroxylated polyether, and an organic isocyanate are combined in a spontaneous, exothermic reaction to yield the copolymer, which may used in applications such as shock mounts and rubber tires. These products are stated to exhibit superior moisture resistance compared to products that do not contain the silicone component.

NYILAS, U.S. Pat. No. 3,562,352, is directed to block copolymers of a polyurethane and a polysiloxane having direct silicon-nitrogen linkages. The copolymers are stated to have medical applications because they have high blood compatability and are non-thrombogenic, possibly due to an absence of hydrogen binding sites.

HISAKI et al., U.S. Pat. No. 4,464,431, is directed to reducing the coefficient of friction of sportswear fabric by treating the fabric with an aqueous mixture that includes an organopolysiloxane and a urethane prepolymer. The free isocyanate group of the urethane prepolymer, which is initially blocked, is freed by heating, which causes the organopolysiloxane to become bound to the fabric being treated over a layer of polyurethane.

MABUCHI et al., U.S. Pat. No. 4,572,871, is directed to a glass-run for the window glass of an automobile composed of a blend of a first urethane prepolymer; a castor oil polyol; a second urethane prepolymer; a fluoro resin; and a silicone oil. This blend is asserted to exhibit high abrasion-resistance.

YAMAZAKI et al., U.S. Pat. No. 4,572,872, is directed to a glass-run for the window glass of an automobile having improved abrasion resistance. The glass run is formed from a composition that includes a urethane polymer; a castor oil polyol; a urethane prepolymer; a fluoro carbon resin; a silicone oil; and at least one of a silica, a clay, and calcium carbonate.

It is noteworthy, when viewing the present invention in light of the the prior art, that most of the foregoing patents do not appear to employ any copolymerization of the various silicon-containing ingredients mentioned therein with urethane or isocyate. For example, while silicone oil is mentioned as an additive in several of these patents, there is no indication that the oil reacts chemically with other ingredients in the blend at issue.

Copolymerization in some form does take place in Japanese Patent 046008; REISCHL; HALUSKA; and NYLLAS. However, REISCHL and HALUSKA are directed towards improving the moisture resistance of polyurethanes, while NYLLAS is directed towards providing blood contact surfaces for devices having medical applications. The Japanese patent deals with weatherstripping for car doors and is directed towards a silicone-isocyanate prepolymer mixed with polyurethane resin, rather than towards a urethane-siloxane copolymer. None of these references teaches a urethane-siloxane copolymer disclosed to be useful in providing high-slip, low-friction coatings which are resistant to abrasion and which adhere to substrates such as rubbers and plastics.

As can be readily seen from the preceding discussion, nowhere in this prior art is there described a one-pack coating system capable of imparting high surface slip, abrasion resistance, and water resistance when coated onto a rubber or plastic substrate. The MABUCHI et al. and YAMAZAKI et al. patents, which represent the only prior art located in one particularly preferred field of the present invention, employ cumbersome, multi-component systems. Moreover, these systems are not asserted to provide high surface slip or to be water resistant, both of these properties being critical to applications such as automotive window channels.

The window glass in a car window will typically be opened and closed thousands of times over the life of the car. It is essential that the material lining the channels in which the glass moves have exceptionally high surface slip and resistance to abrasion, to last for the life of the car.

Moreover, the lining material should be moisture resistant to form a watertight seal with the window glass and thereby prevent water both from entering the interior of the car, and from seeping down into the interior of the door and causing body damage and/or rusting of the door opening and locking mechanisms.

The need for the liner to have high surface slip is not simply a corollary of minimizing surface wear, but is equally importantly as a user consideration. The resistance to raising and lowering a window to be expected from any significant adherence between the liner and the window glass, such as might be expected with uncoated rubber, would not only be a serious source of aggravation to the user, but would place a serious strain on the components of the mechanism for moving the window, shortening their life expectancy.

As a final consideration, it would be valuable if the liner had very low adherence to ice, that is, possessed ice release properties. The familiar phenomenon of car windows being frozen in place by wet snow followed by low temperatures, or by an ice storm, is not only annoying but potentially dangerous due to consequent obstruction of the driver's vision. Moreover, even if the user is willing to take the trouble to chip the ice or frozen snow loose after it fails to dislodge easily, any appreciable degree of adherence between the frozen material and the liner may result in damage to the liner resulting from the force used to separate the two.

SUMMARY OF THE INVENTION

The present invention is directed to a reaction product comprising a reactive silicone, a polyol, and an isocyanate. The reactive silicone is present in an amount of between about 0.5 and 25 percent by weight of the reaction product. In a preferred embodiment the reactive silicone is present in an amount of between about 1 and 10 percent by weight of the reaction product; in a particularly preferred embodiment, the reactive silicone is present in an amount of between about 2 and 7 percent by weight of the reaction product.

The polyol forms between about 10 and 70 percent by weight of the reaction product. In a preferred embodiment the polyol is present in an amount of between about 20 and 70 percent by weight of the reaction product, and in a particularly preferred embodiment, the polyol forms between about 30 and 70 percent by weight of the reaction product.

The isocyanate is present in the reaction product in an amount of between about 10 and 60 percent by weight of the reaction product. In a preferred embodiment the isocyanate is present in an amount of between about 20 and 60 percent by weight of the reaction product, and in a particularly preferred embodiment the isocyanate is present in an amount of between about 30 and 50 percent by weight of the reaction product.

The reactive silicone component of the reaction product may be generally described as a polydialkyl-substituted polysiloxane having at least two reactive functionalities that are reactive with isocyanate. These functionalities may be selected from the group consisting of carbinol, amino, thiol, and epoxy functionalities. Each alkyl group of the polydialkyl-substituted polysiloxane may contain from 1 to 10 carbons, preferably from 1 to 6 carbons, and most preferably from 1 to 4 carbons.

The polyol component of the reaction product may be polyester, polyether, and combinations thereof.

A broad range of isocyanates are suitable for use in the present invention, including tolylene diisocyanate and its dimer, phenylene diisocyanate and its dimer and trimer, methylene bis(4-phenylisocyanate), methylene bis(cyclohexylisocyanate), isophorone diisocyanate ("IPDI"), hexamethylene diamine urea-polyisocyanate, and polymeric methylene poly(phenylisocyanate).

The present invention is further directed to a urethane-siloxane copolymer, which is a copolymer of polydialkyl siloxane and polyurethane. The copolymer may be a random copolymer. The polydialkylsiloxane may be present in an amount of between about 0.5 to 25 weight percent of the copolymer, preferably between about 1 and 10 weight percent, and most preferably between about 2 and 7 weight percent. Each alkyl group of the polydialkylsiloxane may contain from 1 to 10 carbons, preferably from 1 to 6 carbons, and most preferably from 1 to 4 carbons. The remaining non-siloxane portion of the copolymer may comprise about 75 to 99.5 percent by weight of the copolymer, preferably between about 90 and 99 weight percent and most preferably between about 93 and 98 weight percent.

The invention is further directed to a coating composition, which includes a polydialkylsiloxane-polyurethane copolymer. The coating composition may include a nonprotic solvent, such as toluene, xylene, or propylene glycol methyl acetate, and the solvent may be present in an amount sufficient to yield a viscosity of the coating composition that is appropriate for the coating method employed.

The coating composition may also include additives, modifiers, and fillers, such as additional urethanes, halogenated polyolefins, chlorinated natural elastomers, chlorinated synthetic elastomers, carbon black, teflon powder, polyethylene powder, talcum powder, graphite, wetting agents, surfactants, curatives, anti-float agents, and combinations thereof.

In another aspect, the present invention is directed to a coated article, wherein the article is coated with a cured composition comprised of polydialkyl siloxane-polyurethane copolymer. This copolymer may be a random copolymer, in which the polydialkyl siloxane is present in an amount of between about 2 and 10 percent by weight of the copolymer. The non-siloxane portion of the copolymer is present in an amount of between about 98 and 90 percent by weight of the copolymer. Each alkyl group of the polydialkylsiloxane may contain from 1 to 10 carbons, preferably from 1 to 6 carbons, and most preferably from 1 to 4 carbons. The substances which may form the article to be coated include ethylene-propylene-diene terpolymer, natural rubbers, synthetic rubbers, plastics, metals, leather, fabric, glass, ceramics, and combinations thereof.

In a further aspect, the present invention provides a method of making a copolymer, in which at least one reactive silicone, at least one reactive polyol, and at least one isocyanate are combined, and reacted under conditions sufficient to produce copolymerization among them. The reactive silicone is present in this reaction mixture in an amount of between about 0.5 and 25 percent by weight of the reaction mixture, preferably between about 1 and 10 percent, and most preferably between about 2 and 7 percent.

The polyol may be present in the reaction mixture in an amount of between about 10 and 70 percent by weight of the reaction mixture. In a preferred embodiment the polyol is present in an amount of between about 20 and 70 percent by weight of the reaction mixture, and in a particularly preferred embodiment the polyol is present in an amount of between about 30 and 70 percent by weight of the reaction mixture.

The isocyanate may be present in the reaction mixture in an amount of between about 10 and 60 percent by weight of the reaction mixture. In a preferred embodiment the isocyanate is present in an amount of between about 20 and 50 percent by weight of the reaction mixture, and in a particularly preferred embodiment the isocyanate is present in an amount of between about 30 and 50 percent by weight of the reaction mixture.

The proportion of ingredients in the reaction mixture is selected such that the ratio of NCO groups to OH groups in the reaction mixture is between about 1.3 and 2.5, preferably between about 1.5 and 2.3.

The reaction mixture further comprises a non-protic solvent, such as xylene, toluene, or propylene glycol methyl acetate, which is present in the mixture in an amount of between about 20 to 50 weight percent of the mixture.

A catalyst, such as stannous octoate or diazabicyclooctane, may be added to the reaction mixture if desired.

The copolymerization is carried out by heating the reaction mixture to a temperature of between about 50° and 100° C. Heating is continued until the NCO content of the mixture reaches a level of between about 1 and 5 percent, as measured by standard titration. In a preferred embodiment heating is continued until the NCO content of the mixture reaches a level of between about 2 and 5 percent, and in a particularly preferred embodiment heating is continued until the NCO content of the mixture reaches a level of between about 2 and 3 percent.

In yet another aspect, the present invention is directed to a single-component coating, which contains a copolymer of polydialkylsiloxane and polyurethane. This is a "single-component" coating in the sense that the copolymer of polydialkyl siloxane and polyurethane is the only active ingredient. As may be seen from the Examples which follow, this copolymer may be used in a coating composition whose only additional ingredients are xylene, propylene glycol methyl acetate, carbon black masterbatch, curatives (crosslinkers), and catalysts, without the need for additional urethane prepolymers. The copolymer may be a random copolymer, in which the polydialkyl siloxane is present in an amount of between about 2 and 10 percent by weight of the copolymer. Each alkyl group of the polydialkyl siloxane may contain from 1 to 10 carbons.

The present invention further extends to a composition which includes a prepolymer in a solvent, wherein the prepolymer comprises a copolymer of polydialkylsiloxane and polyurethane. This copolymer is a prepolymer in that the copolymer is terminated in isocyanate functionality, and cures to a substrate upon application, either by moisture cure or, if the isocyanate functionalities have been blocked, by heating. Thus, the prepolymer has yet to undergo the curing reaction that will produce the finished coating. The prepolymer may be a random copolymer, in which the polydialkyl siloxane is present in an amount of between about 2 and 10 percent by weight of the copolymer. The solvent containing the prepolymer may be xylene.

DESCRIPTION OF PREFERRED EMBODIMENTS

It has now been discovered that, by copolymerizing a reactive silicone, a polyester or polyether polyol, and an isocyanate compound, a coating composition can be produced with remarkably high surface slip, outstanding abrasion resistance, and excellent water repellence. Moreover, it is expected, as a corollary to the water repellence exhibited by the coating composition of the present invention, that the coating will additionally possess superior ice release properties.

By "reactive silicone" is meant a polydialkyl-substituted polysiloxane bearing at least two, and preferably two or three, functional groups. The alkyl groups may each contain from 1 to 10 carbons, and the functional groups may, for example, be carbinol, amino, thiol, or epoxy groups. Representative examples of suitable reactive silicones are hydroxypolydimethyl siloxanes (such as DC-1248 and Q4-3667, both available from Dow-Corning, and X-22-160C, available from Shinetsu); aminopolydimethyl siloxanes (such as DC-536, available from Dow-Corning, and GP-4, available from Genesee Polymers); and polydialkylpolyepoxide polysiloxane.

The reactive silicone component of the reaction mixture may have a molecular weight range of from about 200 to 10,000, with a range of from about 300 to 9,000 being preferred, and a range of from about 1,000 to 7,000 being most preferred.

At least one other isocyanate-reactive polyol must also be present in the reaction mixture. The isocyanate-reactive polyol may be a polyhydroxy-functional polyester or polyether. Suitable polyesters, which may be aliphatic or aromatic, may be comprised of repeat units such as polycaprolactone, polyadipate, polyphthalate and blends thereof.

Suitable polyhydroxy-functional polyethers include polypropylene oxide polyol and polytetramethylene oxide polyol.

The isocyanate-reactive polyol may have a molecular weight range of from about 200 to 10,000, with a range of from about 500 to 6,000 being preferred, and a range of from about 1,000 to 5,000 being most preferred.

Other polyols may be present in the reaction mixture, and may be employed to cross-link the resulting polymer if desired.

A wide variety of commercially available isocyanates are suitable for use in the reaction mixture, including tolylene diisocyanate, phenylene diisocyanate, methylene bis(4-phenylisocyanate), methylene bis(cyclohexylisocyanate), isophorone diisocyanate, hexamethylene diamine urea-polyisocyanate, and polymeric methylene poly(phenylisocyanate).

An excess of isocyanate functionality is generally used in the reaction mixture, so that the resulting urethane-siloxane copolymer will be terminated in isocyanate functionality. Preferably, the ratio of NCO groups to OH groups is between about 1.3 and 2.5, and is most preferably between about 1.5 and 2.3.

The reactive silicone, the isocyanate-reactive polyol, and the isocyanate are combined in a non-protic solvent, such as toluene, xylene or propylene glycol methyl acetate. The reaction mixture is then heated until the desired percentage of NCO functionality is reached, as determined by standard titration. Any desired optional additives and/or fillers may be added, preferably at the termination of the copolymerization reaction.

The desired percentages of NCO functionality in the resulting prepolymer is generally between about 1 and 5 percent, with a range of from about 2 to 5 percent being preferred, and a range of from about 2 to 3 percent being most peferred.

In a particularly preferred reaction, the amount of reactive silicone in the reaction mixture is from about 3 to 15 weight percent; the non-protic solvent is present in an amount of from about 20 to 50 percent (the precise amount being a function of the desired prepolymer viscosity); and the mixture is heated at a temperature of from about 50° to 100° C.

If desired, the reaction may be assisted by the use of a catalyst, such as stannous octoate or diazabicyclooctane.

During this reaction, the isocyanate-reactive polyol and hydroxy function reactive silicone react with the isocyanate to form urethane copolymer linkages. If the reactive silicone contains amine groups, these may react with isocyanate during the copolymerization to produce urea linkages. If the reactive silicone contains thiol groups, these may react with isocyanate during the copolymerization to produce thio-urethane linkages. If the reactive silicone contains epoxy groups, these may react during the copolymerization to produce oxazolidone linkages. In any event, the resulting urethane-siloxane copolymer is probably a random copolymer, with the reactive silicone making up approximately 5 to 10 percent of the copolymer.

After the desired percentage of isocyanate functionality has been reached, the reaction mixture is cooled and an NCO-blocking agent, such as methylethylketone oxime, may be added. The product of the foregoing reaction, whose critical component is the urethane-siloxane copolymer, may then be blended into a coating composition, using a standard solvent such as xylene, toluene, or propylene glycol methyl acetate. The coating composition is open to the inclusion of a wide variety of additives, fillers, and modifiers, including additional urethanes, halogenated polyolefins, chlorinated natural elastomers, chlorinated synthetic elastomers, carbon black, Teflon powder, polyethylene powder, talcum powder, graphite, wetting agents, surfactants, curatives, anti-float agents, and similar materials.

These coating compositions may be applied to substrates, such as natural and synthetic rubber, plastic, metal, glass, or fabric, in any conventional manner, including brushing, spraying, and dipping. The percentage of solids in the coating composition may be easily determined by one of ordinary skill in the art depending on the precise application method contemplated.

Once applied, the coatings may cure under ambient (moisture cure) or heated (thermal cure) conditions, as determined by the formulation of the particular coating being used. Full curing of the coating is essential for maximal results, in terms of the lowest possible slip angle.

Naturally, the above description of the present invention is given by way of non-limiting example only, in which particular means, methods, and materials are disclosed. It is to be understood, however, that the present invention is not limited to the specifics disclosed and extends to any and all equivalents within the scope of the claims.

To further illustrate and explain the present invention, reference may be had to the following examples, which are likewise non-limiting;

In these examples, TP-440 is a polyether polyol commercially available from BASF Corporation; LHT-42 is a glycerol-propylene oxide polyether triol commercially available from Union Carbide Corporation; Desmodur W is a dicyclohexylmethane-4,4'-diisocyanate commercially available from Mobay Corporation; Tone ® 0200 is a polycaprolactone diol commercially available from Union Carbide Corporation; Tone ® 0310 is a polycaprolactone triol commercially available from Union Carbide Corporation; T-9 catalyst is an organotin stannous octoate catalyst commercially available from Air Products and Chemicals, Inc.; polytetramethylene glycol 2000 is a polyether glycol commercially available from Du Pont Company; Troykyd is a petroleum distillate commercially available from Troy Chemical Corporation; Quadrolis a tetrahydroxypropyl ethylene diamine commercially available from BASF Corporation; MEK Oxime is a methyl ethyl ketoxime commercially available from Mooney Chemicals, Inc.; TDI is an abbreviation for toluene diisocyanate; IPDI is an abbreviation for isophorone diisocyanate; Nuosperse 657 is a modified polyester in solution, commercially available from Nuddex Inc.; T-12 catalyst is an organotin dibutyltin dilaurate commercially available from Air Products and Chemicals, Inc.; and Chemglaze 9992 and 9995 are catalysts commercially available from Lord Corporation.

EXAMPLE 1

Preparation of Urethane-Siloxane Copolymer

The following polyether urethane-siloxane copolymer I was prepared by combining the following ingredients in the amounts indicated, and heating the reaction mixture from 50°–100° C. until the indicated NCO content was reached.

| Ingredient | Weight | Equivalents |
|---|---|---|
| Polytetramethylene glycol 2000 | 287.4 | 0.28 |
| DC-1248 | 72.37 | 0.04 |
| TP-440 | 67.44 | 0.47 |
| LHT-42 | 133.16 | 0.09 |
| Desmodur W | 187.6 | 1.43 |

-continued

| Ingredient | Weight | Equivalents |
|---|---|---|
| Stannous octoate | 0.1 | — |
| Xylene | 256.0 | — |

When the NCO content reached 2.2%, the reaction was cooled and an equivalent amount (42.9 grams) of methylethylketone oxime was added to block the NCO groups.

As a further example, the following polycaprolactone polyester-type urethane-siloxane copolymer II was synthesized by conditions essentially equivalent to those for copolymer I:

| Ingredient | Weight | Equivalents |
|---|---|---|
| Tone$^r$ 0200 | 173.0 | 0.66 |
| Tone$^r$ 0310 | 100.0 | 0.34 |
| DC-1248 | 53.0 | 0.027 |
| Desmodur W | 201.0 | 1.53 |
| T-9 catalyst | 0.15 | — |
| Xylene | 278.0 | — |

After the percent NCO reached 2.7%, the reaction mixture was cooled and 44.4 grams of methylethylketone oxime blocking agent was added.

In a third example, copolymer III was prepared as follows:

| Ingredients | Weight % | Equivalents |
|---|---|---|
| Tone$^r$ 0200 | 22.67 | 0.66 |
| Tone$^r$ 0310 | 13.06 | 0.337 |
| DC-1248 | 2.31 | 0.0088 |
| Desmodur W | 25.56 | 1.49 |
| Xylene | 36.40 | |
| T-9 catalyst | 0.005 | |

The mixture was heated gradually from 52° to 92° C., until the NCO content dropped to 2.61%.

EXAMPLE 2

Preparation of Coating Composition

The following formulated coatings A and B were prepared from the above copolymer I. Coating C is a control without copolymer.

| Ingredient | Coating A | Coating B | Coating C |
|---|---|---|---|
| Prepolymer 1 | — | 220 | 126.5 |
| Prepolymer 2 | — | — | 56.7 |
| Prepolymer 3 | 401 | — | — |
| Copolymer I | 200 | 110 | — |
| T-12 catalyst | 0.08 | 0.04 | 0.03 |
| Carbon black Masterbatch* | 878 | 481 | 265 |
| Troykyd | 5.9 | 3.3 | 1.6 |
| Xylene | 350.8 | 494 | 100 |
| Quadrol | 17 | 9.3 | 5.2 |
| MEK Oxime | 52 | 29 | 18 |
| Slip Angle | 9° | 10° | 36° |

Prepolymer 1 is the reaction product of polypropylene glycol (Hydroxyl value 112) and TDI.
Prepolymer 2 is the reaction product of polypropylene glycol (Hydroxyl value 56) and TDI.
Prepolymer 3 is the reaction product of polycaprolactone glycol (Hydroxyl value 214) and TDI.
*Carbon black Masterbatch was prepared from the following ingredients:

Dry Weight (%)

| Ingredient | Coating A | Coating B | Coating C |
|---|---|---|---|
| Carbon black (Raven) | | 6.2 | |
| IPDPI | | 4.7 | |
| Nuosperse 657 | | 0.5 | |
| Prepolymer 3 | | 11.9 | |
| Cellulose butyrate | | 2.4 | |
| Xylene | | 18.4 | |
| Propylene glycol methyl acetate | | 39.7 | |
| n-butyl acetate | | 16.2 | |

The coating compositions were applied to paper substrates, solvent allowed to flash off, then cured in an oven at 450° F. for about 5 minutes. The indicated slip angles (measured by a simple inclined plane arrangement) were obtained with coatings A, B, and C. The necessity of urethane-siloxane copolymer is obvious.

The following two coating formulations were prepared from copolymer II:

| Ingredient | Coating D | Coating E |
|---|---|---|
| Polyester prepolymer 3 | 110.0 | 80.0 |
| Copolymer II | 55.0 | 90.0 |
| MEK Oxime | 14.5 | 10.5 |
| Carbon black Masterbatch | 359.3 | 240.0 |
| Quadrol | 4.5 | 4.5 |
| Troykyd | 1.64 | 1.64 |
| T-12 catalyst | 0.23 | 0.20 |
| Xylene | 97.0 | 97.0 |
| Slip Angle | 5° | 5° |

These coatings exhibited extremely low coefficients of friction, as indicated by slip angles of 5 degrees each. A similar coating composition without copolymer gives a slip angle in excess of 30 degrees.

A coating composition using copolymer III was prepared by diluting 187.4 g of the copolymer with 56.7 g of xylene and 64.9 g of BC-300 (propylene glycol methyl acetate). This mixture was added gradually, with stirring, to a 290.9 grams of carbon black masterbatch.

The resulting coating composition, when catalysed with 2.5% Chemglaze 9992 and 4.5% Chemglaze 9995 (both manufactured by Lord Corporation), resulted in a film exhibiting a slip angle of 6° after curing for 18 hours at room temperature.

Another coating having a copolymer III as the only ingredient (no carbon black) resulted in a film having a slip angle of 16° after curing for 48° at room temperature in the presence of catalysts.

The foregoing examples clearly establish that the urethane-siloxane copolymers of the present invention may be used in the formulation of coating compositions which, when coated and cured onto substrates, produce coatings with exceptionally high surface slip.

What we claim is:

1. A high surface slip, water repellant, abrasion resistant coating composition comprising a reaction product of
   (A) a polydialkyl-substituted polysiloxane having at least two reactive functionalities that are reactive with an isocyanate and selected from the group consisting of carbinol, amino, thiol and epoxy functionalities,
   (B) a polyisocyanate; and (C) an isocyanate reactive polyol having a molecular weight from about 200 to 10,000 and selected from the group consisting of polyether and polyester, wherein said coating composition imparts a slip angle of from 5° to 16° to an elastomer substrate as measured by an inclined plane arrangement, and wherein component (A) is from about 1 to about 10% weight based on total weight of said reaction product; and (B) and (C) are from 90 to about 99% weight based on total weight of said reaction product.

2. The coating composition of claim 1 wherein said polydialkyl-substituted polysiloxane has at least one siloxy-containing carbinol compound.

3. The coating composition of claim 1 wherein said poly-isocyanate is selected from the group consisting of toluene diisocyanate, methylene bis(cyclohexylisocyanate), methylene bis(4-phenylisocyanate) and isophorone diisocyanate.

4. A coated article providing a surface having the features of high slip, water repellency and abrasion resistance wherein said coating composition comprises the reaction product of (A) a polydialkyl-substituted polysiloxane having at least two reactive functionalities that are reactive with an isocyanate and selected from the group consisting of carbinol, amino, thiol and epoxy functionalities, (B) a polyisocyanate; and (C) an isocyanate reactive polyol said compound having a molecular weight from about 200 to about 10,000 and selected from the group consisting of polyether and polyester, wherein said coated surface of said article has the property of a high surface slip from 5° to 16° as measured by an inclined plane arrangement and (A) is from about 1 to about 10% weight of (A), (B) and (C) combined; and the combination weight of (B) and (C) are from about 90 to about 99% weight of (A), (B) and (C) combined.

5. The coated article of claim 4 wherein said polydialkyl-substituted polysiloxane has at least one siloxy-containing carbinol compound.

6. The coated article of claim 5 wherein said polyisocyanate is selected from the group consisting of toluene diisocyanate, methylene bis(cyclohexylisocyanate), methylene bis(4-phenylisocyanate) and isophorone diisocyanate.

* * * * *